United States Patent [19]

Osborn, Jr.

[11] 3,708,645
[45] Jan. 2, 1973

[54] METHOD OF HEATING A WORKPIECE OF PARTICULATE MATERIAL

[75] Inventor: Harry B. Osborn, Jr., Pepper Pike, Ohio

[73] Assignee: Park-Ohio Industries, Inc., Cleveland, Ohio

[22] Filed: Oct. 12, 1971

[21] Appl. No.: 188,018

[52] U.S. Cl. .........219/10.41, 219/10.57, 219/10.73, 219/149
[51] Int. Cl. ..............................................H05b 9/00
[58] Field of Search..219/10.73, 10.57, 10.41, 10.81, 219/148, 149, 154, 10.65, 50

[56] References Cited

UNITED STATES PATENTS

| 2,439,966 | 4/1948 | Dinzl | 219/10.57 X |
| 1,981,630 | 11/1934 | Northrup | 219/10.41 |
| 2,792,317 | 5/1957 | Davis | 219/10.73 X |
| 2,355,954 | 8/1944 | Cremer | 219/149 X |
| 2,339,607 | 1/1944 | Smith | 219/10.81 |

Primary Examiner—C. L. Albritton
Assistant Examiner—B. A. Reynolds
Attorney—Meyer, Tilberry and Body

[57] ABSTRACT

A workpiece formed from compacted, electrically conductive particles is heated by first passing a high-frequency current through the workpiece and then by inductively heating the workpiece.

2 Claims, 3 Drawing Figures

INVENTOR.
HARRY B. OSBORN, JR.

METHOD OF HEATING A WORKPIECE OF PARTICULATE MATERIAL

This invention pertains to the art of induction heating and more particularly to a method of heating a workpiece formed from particles. The present invention is particularly applicable for heating a powdered metal workpiece for sintering and it will be described with particular reference thereto; however, it is appreciated that the invention has much broader applications and may be used for heating various types of workpieces formed from electrically conductive particles for a variety of purposes. For instance, it is applicable for heating a sintered metal workpiece prior to the final pressing into shape and size.

Powdered metal workpieces are first formed into a roughly shaped, compacted mass held together by an appropriate binder or another adhesive or cohesive arrangement. Thereafter, the mass is sintered by heating the particles forming the workpiece to a temperature sufficiently high for fusion between the particles. In some instances, after sintering the workpiece, it is pressed into a final shape and size. A variety of methods have been used for heating the workpieces for sintering and preparatory to a final pressing operation. Because the workpiece is formed from fine, electrically conducting particles, it has been common practice to pass the workpiece through a gas-fired oven or furnace wherein the workpiece is raised to the sintering temperature by direct flame heating. As in many other heating installations, it is desirable in heating powdered metal workpieces to avoid gas-fired heating for several reasons, such as the bulky and somewhat unsightly equipment required, the poor control over the heating operation and the ambient contamination caused by gas-fired heating. Consequently, in sintering powdered metal parts, it has become somewhat common to heat the parts inductively. This is accomplished by surrounding the parts with an induction heating coil and passing a high frequency current through the coil. This induces a current flow within the surface of the workpiece and heat energy from the surface is conducted internally for the purpose of raising the total workpiece to the sintering temperature. This process has one disadvantage. Since induction heating, which is basically a skin effect, heats the outside surface of the workpiece preferentially, this causes sintering at the surface which increases the ability of the surface to be inductively heated. This process is somewhat progressive and the surface of the workpiece is heated rapidly. Conduction of heat through the compacted particles for heating the interior of the workpiece is relatively slow because of the poor conduction coefficient between the unsintered interior particles. Consequently, induction heating of the particulately formed workpiece requires a substantial amount of time to provide sufficient heating at the center of the workpiece.

These disadvantages of prior methods for heating the particles in a powdered metal workpiece are overcome by the present invention which is directed toward a method whereby the particles are first partially bonded together by resistance heating and then finally heated by induction heating. Since the particles are partially bonded together throughout the total mass of the workpiece, the progressive heating at the surface of the workpiece does not result. Consequently, the partially sintered workpiece is inductively heated like a standard solid workpiece.

In accordance with the present invention, there is provided a method of heating a workpiece formed from a compacted electrically conductive material. This method comprises the steps of placing at least two electrical contacts against the workpiece and then passing the current having a frequency of at least about 1,000 cycles per second between the contact and through the workpiece.

By utilizing the high frequency of at least about 1,000 cycles per second, the particles forming the workpiece can be heated by the $I^2R$ effect. Before partial sintering there is no good conductive path through the workpiece because of resistance created between the individual particles. This prevents efficient $I^2R$ heating of the workpiece if lower frequencies in the neighborhood of 60 cycles per second were employed.

The primary object of the present invention is the provision of a method of inductively heating a workpiece formed from compacted, electrically conductive particles which method allows rapid heating of the particles to a sintering temperature. The sintering temperature varies with the particular particles being used and does not form a part of the present invention. These temperatures are well known in the art of powdered metallurgy.

This and other objects and advantages will become apparent from the following description, taken together with the accompanying drawing in which.

Figure 1:
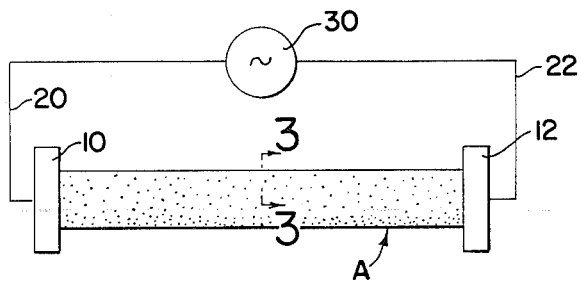
FIG. 1 is a schematic view illustrating one aspect of the present invention.

Referring now to the drawings wherein the showings are for the purpose of illustrating the preferred embodiment of the invention and not for the purpose of limiting same, FIG. 1 shows a workpiece A formed from particles of electrically conductive material as employed in the powdered metallurgical art. The shape of the workpiece is illustrated, for purposes of simplicity, as a cylindrical workpiece; however, in practice the workpiece is usually irregularly shaped and has a multitude of various surface contours. In accordance with the invention, two electrical contacts 10, 12 are placed against the workpiece at spaced positions. Lines 20, 22 connect the contacts with an appropriate power source 30 having an output frequency of at least about 1,000 cycles per second. When the power source is energized, current flows between the contacts 10, 12 and heats the workpiece A by resistance heating, i.e. $I^2R$ heating. By using the high frequency for the power source, sufficient current flows through the workpiece to effect substantial resistance heating. The resistance heating occurs only between the two contacts; therefore, any irregular shapes on the workpiece are not effectively heating in this manner. When this happens, subsequent induction heating, in accordance with the present invention, is employed.

Figure 2:
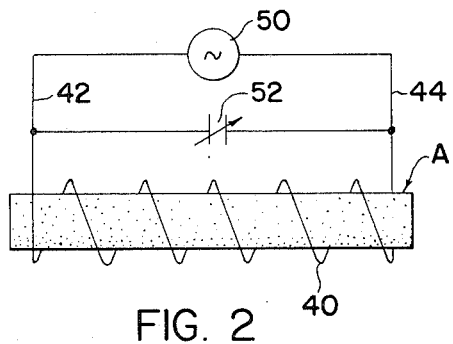
FIG. 2 is a schematic view showing another aspect of the present invention; and, FIG. 3 is an enlarged partial cross-sectional view taken generally along line 3—3 in FIG. 1.
Figure 3:
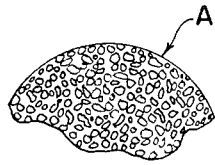

Subsequent induction heating may be employed when resistance heating does not produce uniform results because of shape irregularities or other reasons. Also, subsequent induction heating may be used when it is determined that the efficiency of the total operation requires at least a portion of the heating by the induction method. In either situation only partial sintering is effected by the resistance heating operation illustrated in FIG. 1. Subsequent induction heating can be efficiently performed because the particles in the previously resistance heated workpiece are somewhat bonded or fused together to allow induction heating similar to a solid workpiece. The surface of the workpiece is heated inductively, and the center of the workpiece is heated by conduction through the fused particles. In FIG. 2, a coil 40 is positioned around workpiece A. Leads 42, 44 are connected across an output of a power source 50 having an output with a variety of frequencies. In practice, the frequency is between 60 cycles per second and 3,000 cycles per second. A power factor correcting capacitor 52 is positioned across the leads 42, 44 in the normal fashion to correct the power factor of the total heating installation. As current is passed through the coil 40, the surface of the workpiece A is heated. Since the workpiece particles have been previously fused to a certain extent, there is efficient conduction of the heat from the surface into the interior workpiece so that the total mass of the workpiece is rapidly raised through the final sintering temperature. If the particles were compacted without the previous resistance heating to effect at least partial sintering, the induction heating would be somewhat inefficient because of the progressive effect at the surface. As the surface increases in temperature, the particles will become partially sintered which would facilitate even better induction heating. This would cause substantial heating of the surface without rapid conduction through the unsintered particles toward the center of the workpiece. Consequently, by employing resistance heating by a high frequency current passed through a workpiece formed from particles of conductive material, subsequent induction heating is made practical.

Having thus described my invention, I claim:

1. A method of heating a workpiece formed from compacted, electrically conductive particles to a preselected temperature said method comprising the steps of:

passing a current having a frequency of at least about 1,000 cycles per second through said workpiece to heat said workpiece to a temperature causing at least partial fusing of adjacent particles, but substantially below said preselected temperature; and, inductively heating said workpiece to said temperature.

2. A method as defined in claim 1, wherein said inductive heating step includes surrounding said workpiece with a multi-turn coil and energizing said coil with an alternating current.

* * * * *